Sept. 29, 1959 A. E. LE VAN ET AL 2,906,232
INDICATING INSTRUMENT
Original Filed April 6, 1954 2 Sheets-Sheet 1

INVENTOR.
Ambrose E Levan
Philip W Harland
BY Ralph D. Waite

Pollard, Johnston, Smythe & Robertson
ATTORNEYS

Sept. 29, 1959     A. E. LE VAN ET AL     2,906,232
INDICATING INSTRUMENT
Original Filed April 6, 1954                 2 Sheets-Sheet 2
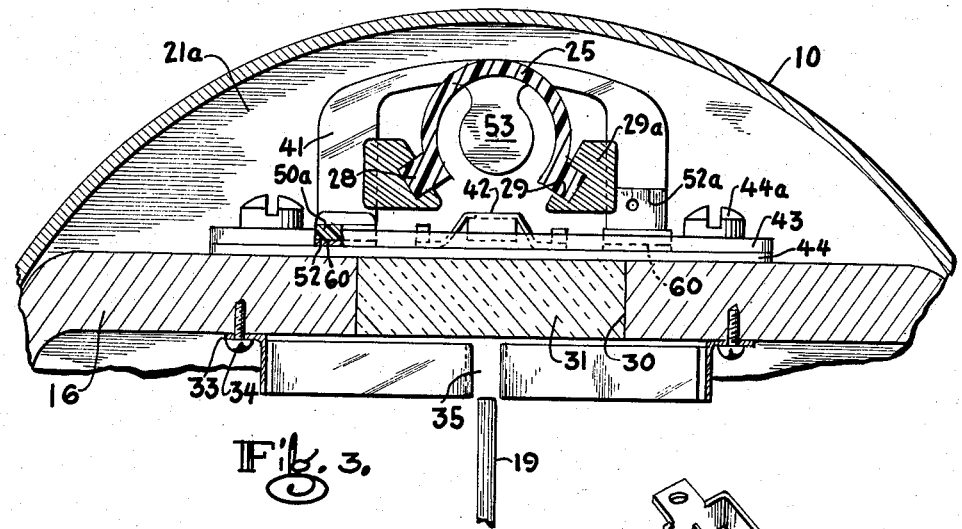
INVENTOR.
Ambrose E. Levan
BY Philip W. Harland
Ralph D. Waite
ATTORNEYS United States Patent Office 2,906,232
Patented Sept. 29, 1959

2,906,232

INDICATING INSTRUMENT

Ambrose E. Le Van, Philip W. Harland, and Ralph D. Waite, Sellersville, Pa., assignors to American Machine and Metals, Inc., New York, N.Y., a corporation of Delaware Original application April 6, 1954, Serial No. 421,332, now Patent No. 2,789,206, dated April 16, 1957. Divided and this application August 27, 1956, Serial No. 606,487

5 Claims. (Cl. 116—129)

This invention relates to indicating instruments. It deals particularly with a new and improved system for illuminating the indicating parts of such instruments. This application is a division of application Serial No. 421,332, filed April 6, 1954, now U.S. Patent 2,789,206.

It is now common practice to install built-in lights for indicating instruments which are to be used in locations where there is insufficient lighting to adequately illuminate the instrument and where it is difficult or inconvenient to direct external light onto the faces of such instruments, such as, for example, in aircraft instrument panels. However, lighting systems for indicating instruments for use in aircraft, particularly military aircraft, have special needs that have not been satisfactorily served by known instruments. Such instruments require a complete illumination of the index and of a sufficiently wide area of the dial to enable reading thereof quickly, or even by just a glance, and such illumination must not impair the vision of the observer by casting undesirable shadows or glare in his eyes. Under flight conditions the bulb acting as the source of illumination must be readily replaceable at any time in the event that it burns out, and under combat conditions the lighting of the instrument must be extinguishable substantially completely and instantaneously so that instrument panel lighting or the afterglow associated with many known lighting systems will not disclose the position of the plane to the enemy.

Therefore, it is an object of this invention to provide an improved lighting arrangement for indicating instruments, particularly those of the type used in aircraft, which meets and completely satisfies the requirements set forth above.

Another object of this invention resides in the provision of complete and uniform illumination of the index and of the portion of the dial to be read without casting shadows or glare into the eyes of an observer at a station in front of the instrument.

A further object of the invention is to provide an illuminating system for indicating instruments and the like which can be blacked-out substantially instantaneously and which has no objectionable afterglow.

According to one aspect of the invention, the instrument includes a casing filled with liquid and having therein a dial card observable through a glass plate serving as the front transparent wall member of the casing, there being a fixed lubber line disposed between the card and the glass plate to serve as an index for reading the instrument. The lubber line and the graduations and reference characters on the dial card may have a coating thereon composed of a mixture of a conventional fluorescent and a conventional radio-active material, the latter being relatively small in proportion to the former. Although the reason is not known, it has been found that when such a combination coating is used and red light is directed onto such members, that the entire lubber line and all the markings on the forward portion of the dial card will appear to be lighted.

In accordance with the present invention, the lubber line and the forward part of the card are illuminated by a built-in bulb arranged at the top and front portion of the casing in a position overlying the lubber line and the forward part of the card. A red filter plate is disposed between the bulb and the indicating members so that red light will be passed through the filter directly onto the lubber line and indicating card. At least a portion of the red light rays is directed toward the front glass plate and from there reflected toward the lubber line. Louvers may be provided to shield the direct rays from the top front portion of the instrument so as to avoid bright spots near the top of the front glass plate or near the top of the lubber line.

These and other objects, features and advantages of the invention will become apparent from the accompanying description and drawing which are merely exemplary.

In the drawings:

Figure 3 is a vertical transverse section taken along line 3—3 of Figure 1;

Figure 4 is a perspective view of a louver and a fragmentary part of a lubber line embodied in the present invention, the louver being partly broken away to show the relationship of the lubber to the louver; and Figure 5 is a perspective view of the contacts arrangement according to this invention.

Figure 1:
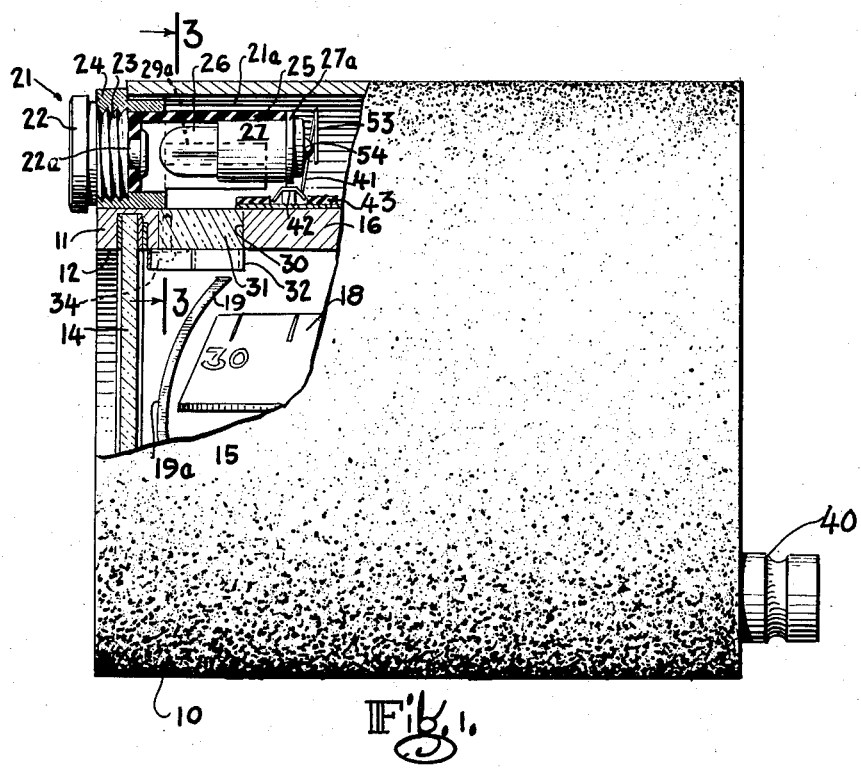
Figure 1 is a side elevation of a compass embodying the present invention, the casing being partly broken away to show various internal parts in vertical section and side elevation.
Figure 2:
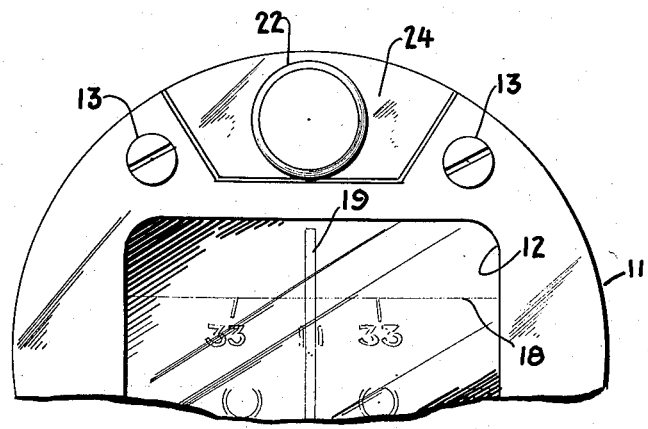
Figure 2 is a fragmentary view in front elevation of the compass of Figure 1.

With reference to the drawings, a magnetic compass unit is shown that includes a cylindrical, non-porous die cast aluminum casing 10 opened at its front end. A frame 11 having a window 12 overlies the front opening of the casing and is secured to the front of the casing by cap screws 13. A glass plate 14 is set in the window of the frame to close the front of the casing and permit observation of the indicating elements within the casing from in front of the unit. Within the casing a sealed chamber 15 is formed by the lateral, bottom and back walls of the casing, by the front cover plate 14 and by an upper partition 16 that extends transversely across the casing in spaced relation to the top portion of the casing. Chamber 15 is filled with liquid, and a float-type card assembly is mounted therein in a manner that forms no part of this invention. Accordingly, only the front portion of the dial card 18 is shown. The card is pivotally mounted to rotate about a vertical axis and is in the form of an annular truncated cone, the outer surface of the card being marked with the usual graduations and reference characters. The card is made of very thin aluminum and the grooves for the graduations and reference characters are made within the die when the card is cast. By such construction these grooves not only provide extremely sharp edges for the graduations and reference characters but also serve as ribs to stiffen the very thin card.

A lubber line 19 is disposed in fixed vertical position within the casing centrally in front of card 18 and is made of a very thin flat strip of metal. The lubber line is arcuate in form and extends upwardly from a support (not shown) disposed near the bottom of the casing 10 to a forward position 19a adjacent the front plate 14 in the vicinity of the bottom of the dial card. From this forward portion the lubber line curves upwardly and rearwardly and terminates at a location above the top of the dial card. Thus, it will be seen that the lubber line slopes in the same direction as the card so as to avoid error in the reading of the card.

The front edge of the lubber line is coated with, and the grooves serving as graduations and characters in the dial card are filled with, a paint that includes both a fluorescent material and a radio-active material, the latter being in a relatively small proportion to the former. The remaining surface of the card is glazed to a semi-mat black finish to provide maximum black density and also maximum color contrast, especially when viewed in its submerged position either under artificial light or daylight. The particular method of fabricating the card not only avoids any shadow, regardless of the angle at which the compass is fixed, but also eliminates undesirable fuzziness of the graduations and characters in the dial card that are usually present in known instruments. This is particularly important in an instrument of the present type wherein the source of illumination is within the casing and the rays of light are at right angles to the angle of vision, being directed onto the face of the dial card with the aid of the filling medium within the casing and its refractive characteristics that tend to magnify minute variations.

A lighting unit, generally indicated at 21, is mounted in a separate compartment 21a within the casing but above sealed chamber 15. The unit includes a bulb 26 having a filament overlying the lubber line 19 and the forward part of the dial card 18, a bulb mounting, and a red filter plate 31 disposed in an opening 30 in the partition 16 to form with the opening a filter window which permits red light to pass therethrough onto the lubber line 19 and dial card 18. It has been found that when the paint used on the lubber line and dial card is subjected to red light, the entire front edge of the lubber line and all the graduations and reference characters on the dial card become illuminated, even the lower portion of the lubber line which is remote from the source of illumination and the top portion of such line which curves rearwardly away from the front plate 14. It has also been found that upon removing the light, the illumination of the lubber line and dial card is cut off within .5 of a second to not more than 5% of the intensity at which it was when the red light was on.

The bulb mounting portion of the lighting unit 21 includes a threaded plug 22 which is threadedly received in a bore 23 of a segment 24, the latter being received and fixed in the front opening of the casing between partition 16 and a circular portion of the top of the casing. Plug 22 carries an elongated substantially horseshoe-shaped harness 25, preferably made of nylon, that is rotatably carried by the plug in any convenient manner, such as by a headed pin 22a as shown in Figure 1. Bulb 25 is adapted to be disposed lengthwise within the harness with its filament near the front of the harness so that most of the useful area of illumination lies directly over the lubber line and the front portion of the dial card. The harness frictionally holds the bulb by gripping the same around its base 27 which has a collar 27a that cooperates with the inner end of the harness to determine the correct position of the bulb in the harness. A portion of the base of the bulb protrudes from the open inner end of the harness to engage an electrical contact as described hereinafter. This fabricated harness will resist temperatures encountered when the unit is operated for extended periods without losing its shape or resilient characteristics that enable it to hold the bulb firmly in fixed position.

The free ends of the legs of the horseshoe-shaped harness have outwardly projecting square-shaped ridges 28 which are received in complementary square-shaped recesses 29 that are formed in guideways 29a fixed to and extending inwardly from segment 24. The guideways serve to hold the bulb firmly in place vertically and laterally with the open section of the harness underlying the bulb so as to permit free passage of light downward through the filter plate 31 to the indicator card assembly. The guideways cooperate with the ridges 28 to determine the angular position of the harness and prevent movement of the harness from the set position as long as the mounting unit is assembled in the compass casing. The harness is preferably milk-white in color so that it serves to reflect and diffuse residual light of the bulb that would otherwise be lost.

The opening 30, in which the filter plate 31 is set, is formed in the partition 16 directly under the filament of the bulb. This opening is substantially longer in a direction transverse to the axis of the casing than it is in the axial or longitudinal direction. The filter plate has a shape corresponding to that of the opening and is welded in place in the opening. This oblong shape of the filter plate together with the disposition of the filament in the filter plate so near the front of the instrument result in a uniform illumination of the dial card 18 over an extremely wide area, for example, over 60°.

At least a portion of the light rays is directed toward the front glass and from there reflected toward the lubber line and the card. Louvers 32 may be provided to shield the direct rays from the top of the instrument so as to prevent "hot" or bright spots on the top lubber line and to avoid any glare that would impair the vision of the observer. Louver 32 comprises a folded thin metal strip having end tabs 33 by which it is secured to partition 16, as by cap screws 34. The louver is formed in three layers, the first layer extending parallel to the front window 14 to points beyond opposite ends of the filter plate so that it is effective over the entire front area of the instrument. The second and third layers of louvers are interrupted midway along their length to form an opening 35 for the free passage of light onto the top portion of the lubber line so as to provide illumination for the lubber line throughout its entire length.

In Figure 5 there is shown on an enlarged scale novel means by which bulb 26 is automatically connected to an electrical circuit when it is mounted in operating position in compartment 21a. Adjacent the position occupied by the inner end of the harness 25 when it is assembled in the casing 10 is a contacts arrangement that includes an upper insulating base plate 43 and a lower insulating base plate 44 that are held in assembled relation and fastened to partition 16 by cap screws 44a. Base plate 44 is a solid piece of hard paper. Base plate 43 is formed with a cross-shaped central recess 45 and two pairs of laterally offset recesses 46, 46 and 50, 50 formed symmetrically on opposite sides of the central recess 45. The portions 46a and 50a of the base plate 43 that extend between openings 46, 46 and 50, 50, respectively, are pressed upwardly and protrude from the upper face of the plate 43 so as to form grooves 60 on the underside of the plate.

Forming one of the contacts is an inverted U-shaped flat metal piece 41 that is supported at its lower end by bent portions 52 of its legs which extend into recesses 46 and 50 and are firmly held between the upper and lower base plates 43 and 44, the bent portions of the legs fitting into the grooves 60. One of the legs is reversely bent at 52a and extends upwardly through one of the recesses 46 to present a suitable terminal to which one lead line 47 may be connected. Piece 41 has a center tongue-like member 53 that depends therefrom and is disposed in the path of the contact 54 on the base of the bulb 26. Member 53 is flexed so as to yieldingly engage such contact when the bulb is set in its normal operating position.

The second contact is formed by a flat metal piece 42 that is yieldingly held in a raised position above the upper surface of base plate 43 and in the path of the collar 27a carried by the bulb base. The piece 42 is supported in its raised position by metal prongs or fingers 48 which are formed integral therewith and which have their ends bent outwardly to be received and held between the upper and lower base plates 43 and 44. One of the fingers may be connected with the other lead line 49 by a metal strip 55 extending across the top of the base plate 43 and a terminal 56. When the bulb 26 is inserted into its operating position as shown in Figure 1 and by broken lines in Figure 5, the collar 27a on the bulb base engages contact 42 and end contact 54 engages contact 53.

There is thus provided a simple and inexpensive lighting arrangement in which the bulb can be easily removed and replaced, with accurate and quick positioning thereof without the exercise of undue care or skill.

It should be apparent that various details of construction can be changed without departing from the spirit of the invention as defined in the appended claims.

What is claimed is:

1. In a magnetic compass of the liquid type, the combination comprising an enclosed housing formed with a front opening closed by a glass cover, an annular dial mounted within said housing for rotation about a vertical axis and having indicating marks thereon, said dial having a front portion adjacent said front opening, a fixed indicator positioned between said front portion and said glass cover, said indicator and the indicating marks on said dial cooperating to show compass direction, said indicating marks and said indicator having a coating thereon including a fluorescent and a radioactive material, a plate in said housing dissecting the same to form an auxiliary compartment above said dial, illuminating means including a bulb disposed in said auxiliary compartment with its filament forward in a position overlying the indicator and the front portion of said dial, and means including a window in said plate having a filter therein for passing red light into the interior of the lower portion of the housing.

2. In a magnetic compass of the liquid type, the combination comprising an enclosed housing formed with a front opening closed by a glass cover, an annular dial mounted within said housing for rotation about a vertical axis and having indicating marks thereon, said dial having a front portion adjacent said front opening, a fixed indicator positioned between said front portion and said glass cover, said indicator and the indicating marks on said dial cooperating to show compass direction, said indicating marks and said indicator having a coating thereon including a fluorescent and a radio-active material, a plate in said housing dissecting the same to form an auxiliary compartment above said dial, illuminating means in said auxiliary compartment including a bulb, a bulb holder having a substantially milk-white color and being adapted to receive and hold lengthwise therein said bulb, said holder enclosing all sides of the filament portion of the bulb except that facing the lower portion of the housing, and means including a window in said plate having a filter therein for passing red light into the interior of the lower portion of the housing.

3. In a magnetic compass of the liquid type, the combination comprising an enclosed housing formed with a front opening closed by a glass cover, an annular dial mounted within said housing for rotation about a vertical axis and having indicating marks thereon, said dial having a front portion adjacent said front opening, a fixed indicator positioned between said front portion and said glass cover, said indicator and the indicating marks on said dial cooperating to show compass direction, said indicating marks and said indicator having a coating thereon including a fluorescent and a radio-active material, a plate in said housing dissecting the same to form an auxiliary compartment above said dial, illuminating means including a bulb disposed in said auxiliary compartment with its filament forward in a position overlying the indicator and the front portion of said dial, and means including a window in said plate having a filter therein for passing red light into the interior of the lower portion of the housing, said filter window being longer in a direction parallel to said front glass cover than in a direction normal thereto.

4. In a magnetic compass of the liquid type, the combination comprising an enclosed housing formed with a front opening closed by a glass cover, an annular dial mounted within said bowl for rotation about a vertical axis and having indicating marks thereon, said dial having a front portion adjacent said front opening, a fixed indicator positioned between said front portion and said glass cover, said indicator and the indicating marks on said dial cooperating to show compass direction, said indicating marks and said indicator having a coating thereon including a fluorescent and a radio-active material, a plate in said housing dissecting the same to form an auxiliary compartment above said dial, illuminating means including a bulb disposed in said auxiliary compartment with its filament forward in a position overlying the indicator and the front portion of said dial, means including a window in said plate having a filter therein for passing red light into the interior of the lower portion of the housing, and louver means below said filter window to shield the top portion of the front glass cover from the direct rays of the bulb.

5. In a magnetic compass of the liquid type, the combination comprising an enclosed housing formed with a front opening closed by a glass cover, an annular dial having indicating marks thereon and sloping outwardly toward said front glass cover from top to bottom, a lubber line positioned in front of the said dial sloping outwardly from its top inner portion to at least the bottom of the dial, said indicating marks and the front edge of said lubber line having a coating thereon including a fluorescent and a radio-active material, a plate in said housing dissecting the same to form an auxiliary compartment above said dial, illuminating means including a bulb disposed in said auxiliary compartment with its filament forward in a position overlying the lubber line and the front portion of the dial, means including a window in said plate having a filter therein for passing red light into the interior of the lower portion of the housing, and louver means below said window to shield the top portion of said front glass cover from the direct rays of the bulb, the rear parts of said louver means being interrupted along their length to pass the direct rays onto the top inner portion of said lubber line.

References Cited in the file of this patent

UNITED STATES PATENTS

| | | |
|---|---|---|
| 1,364,368 | Hamlin | Jan. 4, 1921 |
| 1,445,131 | Day | Feb. 13, 1923 |
| 2,023,934 | Moise | Dec. 10, 1935 |
| 2,191,045 | Slayton | Feb. 20, 1940 |
| 2,648,305 | Appleman | Aug. 11, 1953 |
| 2,677,045 | MacArthur | Apr. 27, 1954 |
| 2,723,342 | Neugass | Nov. 8, 1955 |
| 2,789,206 | Le Van | Apr. 16, 1957 |